S. PEACOCK.
PROCESS OF MAKING CALCIUM FERRITE AND PHOSPHORUS PENTOXID.
APPLICATION FILED AUG. 2, 1909.
988,137.
Patented Mar. 28, 1911.
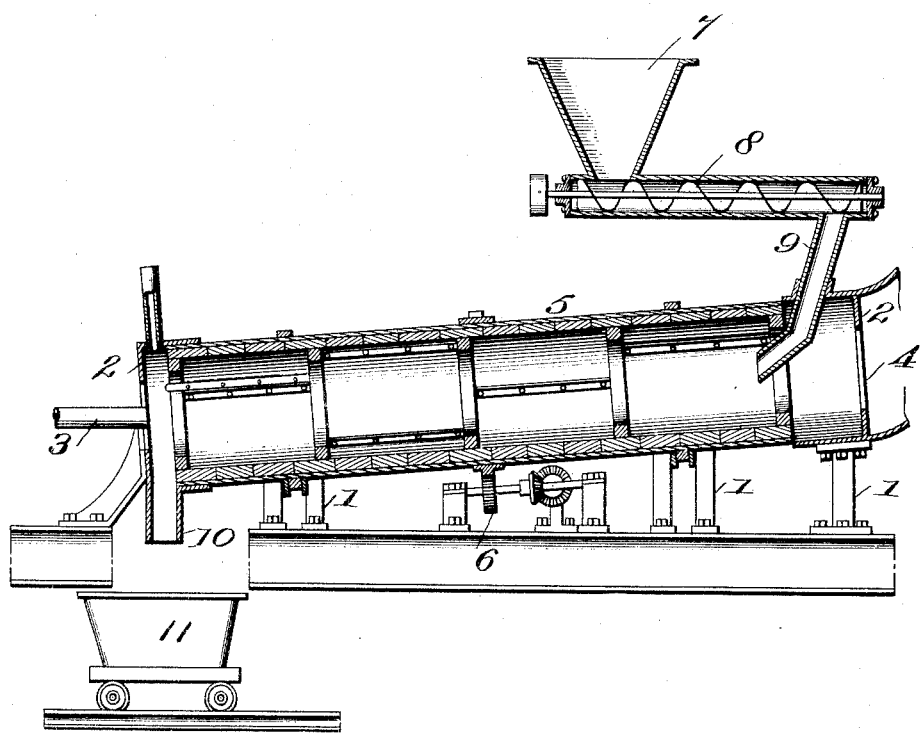

UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING CALCIUM FERRITE AND PHOSPHORUS PENTOXID.

988,137.      Specification of Letters Patent.      Patented Mar. 28, 1911.

Application filed August 2, 1909. Serial No. 510,932.

*To all whom it may concern:*

Be it known that I, SAMUEL PEACOCK, a citizen of the United States, residing at Chicago, in the county of Cook and State of Illinois, have invented certain new and useful Improvements in Processes of Making Phosphorus Pentoxid and Iron Compounds of Calcium; and I do hereby declare the following to be a full, clear, and exact description of the invention, such as will enable others skilled in the art to which it appertains to make and use the same.

This invention relates to a process for making iron compounds of calcium, and the pentoxid of phosphorus ($P_2O_5$), from phosphate rock, or other cheap source of phosphate of lime; and has for its object to produce a simple and comparatively inexpensive process for making these products in a single operation.

To this end the invention consists in the novel steps and combinations of steps constituting my process, more fully hereinafter disclosed and particularly pointed out in the claims.

Referring to the accompanying drawings forming a part of this specification, in which the figure is a sectional diagrammatic view of a well known type of furnace suitable for carrying out my purpose, 1 represents any suitable supports, 2 stationary end closures provided with an inlet 3 for the fuel and an exit 4 for the gases, 5 a rotating barrel part, 6 means for rotating the same, 7 a hopper for receiving the rock mixture, 8 a screw conveyer for the same, 9 a delivery spout leading into the furnace, while 10 represents a suitable delivery passage for the iron compounds of calcium and 11 a suitable receptacle for receiving the same.

For the purposes of this process crude ferric oxid or any cheap source of the same, such as the well known limonite or hematite ores and phosphate of iron may be used. Or any cheap source of lime phosphate, such as the ordinary phosphate rock may be used.

The following analyses may be taken as a basis of calculation:

|  | Iron ore. | Phosphate. |
|---|---|---|
| $Fe_2O_3$ | 52% | 2% |
| $Al_2O_3$ | 8% | 8% |
| $SiO_2$ | 10% | 4% |
| $CaO$ |  | 45% |
| $P_2O_5$ |  | 34% |
| Water, etc. | 30% | 12% |
|  | 100% | 100% |

The reactions involved in the manufacture of the primary calcium compounds are:—

1. $Fe_2O_3 + CaO = CaFe_2O_4$
2. $Al_2O_3 + CaO = CaAl_2O_4$
3. $SiO_2 + CaO = CaSiO_3$

One pound of calcium oxid (CaO) in each of the three reactions, respectively, requires of:—

Ferric oxid ($Fe_2O_3$) .................... 2.85 lbs.
Alumina ($Al_2O_3$) .................... 1.83 "
Silica ($SiO_2$) .................... 1.06 "

That is to say, 2,000 pounds of phosphate analyzing as above will require and contain:—

Calcium oxid (CaO)   900 lbs.
Ferric oxid   ($Fe_2O_3$)   40 " requiring lime..... 14 lbs.
Alumina    ($Al_2O_3$)   60 "    "    " ..... 33 "
Silica       ($SiO_2$)    80 "    "    " ..... 74 "

Total lime required ..................... 121 lbs.

As 2,000 pounds of the above phosphate contain 900 pounds of lime, and only 121 pounds are required by its own ferric oxid, alumina, and silica, there remains 779 pounds of lime in the particular example given, to react with the ferric oxid, etc., contained in the iron ore. But 100 pounds of the iron ore contain and require lime as follows:—

$Fe_2O_3$ ........... 52 lbs. requires of CaO ........... 18 lbs.
$Al_2O_3$ ........... 8 "    "    "    " ........... 5 "
$SiO_2$ ........... 10 "    "    "    " ........... 9 "

Total lime required by the iron ore ........ 32 lbs.

From this it is clear that since there are 779 lbs. of surplus lime (CaO) in the 2000 pounds of phosphate to react with the iron oxid, that the proper proportions of the furnace mixture for this process, with these particular raw materials are: phosphate rock, 2,000 lbs.; iron ore, 2,435 lbs.

A chemically balanced mixture of this nature being produced and prepared preferably in all respects as in the making of Portland cement, I pass the same through and heat it in any suitable furnace, preferably one of the type shown, to about 1300 degrees C., or to 1400 degrees C. when the iron oxid reacts with the lime phosphate substantially in accordance with the following equations:—

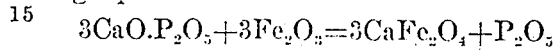

The small quantity of alumina present at the above temperature reacts substantially in accordance with the following equation:—

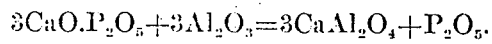

The silica reacts substantially as follows:—

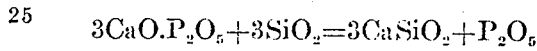

The calcium salt of iron thus produced is mixed with more or less calcium aluminates and silicates, but the pure calcium ferrite or ferrate may be thus manufactured if pure iron and phosphates are used in the process. This calcium ferrite as well as the ferrate is found useful as a bond in making ore briquets, it is also used in preventing certain kinds of cements from suffering injuries when subjected to the action of sea water. Iron cement and alumina cements may be mentioned as instances. At the conclusions of the reactions, the calcium compounds are passed through the exit 10 into suitable receptacles and finished for further uses by grinding, compounding with other materials, etc. The pentoxid of phosphorus ($P_2O_5$) passes out of the exit 4 and is collected in any suitable manner, as by absorption in water, or by a condensation method.

Of course, the above proportions are merely illustrative, and it is to be understood that with different supplies of iron oxids, and of phosphates, different proportions will obtain. It is also to be understood that my invention is not limited to the production of mono calcium salts given as examples in the above reactions, for it is evident that I may produce the various acid or basic calcium salts by properly proportioning the particular iron oxid and phosphate being treated.

It is evident that those skilled in the art may vary the above procedure without departing from the spirit of the invention, and, therefore, I do not wish to be limited to the exact disclosure except as may be required by the claims.

In my co-pending application #502,793, filed June 17, 1909, I have disclosed a process for making calcium aluminate and phosphoric acid; and in my co-pending application #515,803, filed September 2, 1909, I have disclosed a process for making pentoxid of phosphorus, calcium silicates and calcium aluminates.

What I claim is:

1. In the process of producing the pentoxid of phosphorus and calcium ferrite from iron oxid, and lime phosphate, in a single operation, which consists in mixing said iron oxid and phosphate in such proportions that chemically equivalent quantities of calcium oxid will be supplied to the iron oxid present in the mixture to form calcium ferrite; and heating said mixture to a temperature insufficient to completely fuse but sufficient to form said ferrite, and to free said pentoxid from the lime phosphates; substantially as described.

2. In the process of producing the pentoxid of phosphorus and calcium ferrite from iron oxid and phosphate of lime in a single operation which consists in mixing said iron oxid and phosphate in such proportions that sufficient calcium oxid will be present in the mixture to chemically react with substantially all the iron oxid, and alumina, and silica that may also be present; and heating the mixture to a temperature insufficient to completely fuse the mixture but sufficient to bring about such reactions and to free said pentoxid from said phosphates; substantially as described.

3. In the process of producing $P_2O_5$ and $CaFe_2O_4$ from iron oxid and phosphate rock in a single operation which consists in suitably mixing substantially 2,000 pounds of said rock, 2,435 pounds of iron oxid, in suitably heating the said mixture to substantially 1400 degrees C.; in collecting the $P_2O_5$ driven off; and in collecting the $CaFe_2O_4$ formed; substantially as described.

In testimony whereof, I affix my signature, in presence of two witnesses.

SAMUEL PEACOCK.

Witnesses:
  LEO F. MURPHY,
  FRANK S. WASHBURN.